(12) United States Patent
Popov

(10) Patent No.: US 11,804,740 B2
(45) Date of Patent: Oct. 31, 2023

(54) BRUSHLESS ELECTRICAL MACHINE WITH PERMANENT MAGNET EXCITATION

(71) Applicant: Almott Group AD, Stara Zagora (BG)

(72) Inventor: Encho Nikolov Popov, Sofia (BG)

(73) Assignee: ALMOTT GROUP AD, Stara Zagora (BG)

( * ) Notice: Subject to any disclaimer, the term of this patent is extended or adjusted under 35 U.S.C. 154(b) by 136 days.

(21) Appl. No.: 17/548,132

(22) Filed: Dec. 10, 2021

(65) Prior Publication Data
US 2022/0190654 A1 Jun. 16, 2022

(30) Foreign Application Priority Data

Dec. 10, 2020 (BG) .......................................... 113286
Oct. 21, 2021 (EP) ..................................... 21472008

(51) Int. Cl.
| | |
|---|---|
| H02K 1/27 | (2022.01) |
| H02K 1/17 | (2006.01) |
| H02K 1/278 | (2022.01) |
| H02K 21/14 | (2006.01) |
| H02K 1/276 | (2022.01) |

(52) U.S. Cl.
CPC ............... H02K 1/17 (2013.01); H02K 1/276 (2013.01); H02K 1/278 (2013.01); H02K 21/14 (2013.01); *H02K 2213/03* (2013.01)

(58) Field of Classification Search
CPC .... H02K 1/276; H02K 21/14; H02K 2213/03; H02K 2201/03; H02K 1/27
USPC ..................................................... 310/154.03
See application file for complete search history.

(56) References Cited

U.S. PATENT DOCUMENTS

| | | | |
|---|---|---|---|
| 8,575,807 B2 | 11/2013 | Merwerth et al. | |
| 9,755,490 B2 * | 9/2017 | Inuzuka | ................... H02K 1/28 |

(Continued)

FOREIGN PATENT DOCUMENTS

| | | | | | |
|---|---|---|---|---|---|
| CN | | 109792172 A | * | 5/2019 | ............... H02K 1/22 |
| WO | WO-2013105236 A1 | * | 7/2013 | ............. H02K 1/276 |
| WO | WO-2020129210 A1 | * | 6/2020 | ............. F04D 25/06 |

OTHER PUBLICATIONS

WO-2020129210-A1—Machine Translation (Year: 2020).*
WO-2013105236-A1—Machine-Translation (Year: 2013).*
CN-109792172-A—Machine-Translation (Year: 2019).*

*Primary Examiner* — Quyen P Leung
*Assistant Examiner* — Masoud Vaziri
(74) *Attorney, Agent, or Firm* — Brown & Michaels, PC

(57) ABSTRACT

A brushless electrical machine with permanent magnet excitation, designed for propulsion, in particular of boats, pumps, electric vehicles, for operation as a servomotor, etc. The brushless electrical machine provides increased power at significant reduction of the weight and the inertia moment of its rotor. The rotor (11) comprises an outer (12), intermediate (13) and inner (14) steel rings. The surface of the poles of the rotor (11) is formed by interconnected cut-out parts (15). In the rotor (11), above the permanent magnets (17) are formed elongated axial slots (20). By number of poles 2 p less than 16 and at a diameter of the rotor (11) greater than 0.15 m, the axial slots (16) are divided into two equal parts by a third radial rib (25) with maximum width 0.0025 m, which is located under the middle of the cut-out part (15) and is connecting the intermediate ring (13) to the outer ring (12).

5 Claims, 5 Drawing Sheets

(56) References Cited

U.S. PATENT DOCUMENTS

| | | | | |
|---|---|---|---|---|
| 2014/0001906 | A1* | 1/2014 | Li | H02K 1/22 |
| | | | | 310/156.01 |
| 2016/0036281 | A1* | 2/2016 | Nakano | H02K 29/03 |
| | | | | 310/68 D |
| 2016/0294233 | A1* | 10/2016 | Popov | H02K 19/24 |
| 2019/0348877 | A1* | 11/2019 | Kouda | H02K 1/276 |
| 2020/0083768 | A1* | 3/2020 | Yim | H02K 1/2766 |

\* cited by examiner

BRUSHLESS ELECTRICAL MACHINE WITH PERMANENT MAGNET EXCITATION

FIELD OF THE INVENTION

The invention relates to a brushless electrical machine with permanent magnet excitation, designed for propulsion, in particular of boats, pumps, electric vehicles, for operation as a servomotor, etc.

DESCRIPTION OF PRIOR ART

A brushless electrical machine with permanent magnet excitation is known [1], designed for propulsion of electrical vehicles, including a shaft sustained in front and rear end bells by front and rear bearings. The front and rear end bells envelop a stator containing a stator pack covered by a fixed housing. On the inner surface of the stator is formed a plurality of evenly spaced slots in which a three-phase winding is laid. The stator comprises a movable annular rotor fixed to the shaft. In the rotor are formed at least two poles of permanent magnets, which are inserted into axial slots located near its outer surface. The permanent magnets are located in the rotor in one or more layers. Near the permanent magnets and to the outer surface of the rotor are formed groups of holes of different lengths, affecting the magnetic flux between the rotor and the stator. These groups of holes are with different width and are located on both sides of the permanent magnets. The slots are separated from the outer surface of the rotor by thin strips.

The disadvantage of this well-known electric machine is its reduced power at increased weight and moment of inertia of its rotor.

The reduced power is due to the fact that when realizing the electric machine with one layer of permanent magnets, the third harmonic component of the magnetic field in the air gap has an increased value, which increases the losses in the iron of the stator. Another reason for this is that by delta connecting of the phases the electrical losses from the third harmonic component of the current are increased too.

The increased value of the inductive reactance is due to the increased value of the cross magnetic flux generated by the stator winding. It is reason for the increased value of the current and of the electrical losses, in particular, when working in the first zone, which is characterized by a constant torque.

When the known machine is realized with a reduced width of the permanent magnets and with more than one layer of magnets, the disadvantage is the increased mass of the magnets due to moving away of the working zone of the magnets from the point of characteristic, at which energy is maximum.

SUMMARY OF THE INVENTION

It is an object of the present invention to provide a brushless electrical machine with permanent magnet excitation with increased power at significant reduction of the weight and the inertia moment of its rotor.

Invention object is achieved with a brushless electric machine with permanent magnet excitation comprising a shaft sustained in front and rear end bells by front and rear bearings. The front and rear end bells comprise a stator containing a stator pack, covered by a housing. On the inner surface of the stator pack are located a plurality of evenly distributed slots in which a three-phase winding is laid. The stator comprises a movable annular rotor fixed to the shaft. In the rotor are formed at least four poles of permanent magnets inserted into axial slots located near its outer surface. Near the permanent magnets and to the outer surface of the rotor are formed groups of holes with different length affecting the magnetic flux between the rotor and the stator. According to the invention, the annular rotor comprises an outer steel ring, intermediate steel ring and inner steel ring. The outer steel ring contains sequentially interconnected cut-out parts, each of which is shaped as part of a steel cylinder cut in a plane containing the chord from the cylinder cross section. The outer surface of the cut-out parts is the pole of the rotor. The axis of the cylindrical surface of each pole does not coincide with the axis of the shaft. In the areas between the permanent magnets and the corresponding outer surfaces of the rotor are formed groups of holes of different lengths, affecting the magnetic flux between the rotor and the stator. Each group of holes, affecting the magnetic flux between the rotor and the stator, includes at least two elongated slots with a maximum width of 0.0025 m and with a slot orientation that is close to the radial. The ends of the cross section of the elongated slot are shaped like a semicircle and are spaced from the rotor outer surface and from permanent magnets at distances that are less than 0.0025 m. Under the flat wall of each cut-out part is formed the axial slot, in which the permanent magnet is inserted. The outer surface of the cut-out part is a pole of the rotor and has three characteristic points, one of which is in the middle of the pole, spaced apart at a distance $\delta 1$ from the inner surface of the stator, and the other two points are located symmetrically to it at distances of one third of the pole division and are spaced from the inner surface of the stator at a distance $\delta 2$, where the condition $\delta 1 < \delta 2 < 2.6 \delta 1$ is fulfilled. The intermediate steel ring includes quadrangular prismatic parts with a maximum radial dimension of 0.6 Da/p, each of the quadrangular prismatic parts belongs to two adjacent poles of the rotor. The quadrangular prismatic parts are connected to each other by second stripes, which are located under the middle of the poles. The outer steel ring covers the intermediate steel ring and is connected to it by means of first radial ribs located at the boundaries between the poles. The cut-out parts in the area between the permanent magnets and the first radial ribs are formed as first strips with maximum radial size 0.0006 m. The intermediate steel ring is connected to the inner steel ring by means of second radial ribs which are located under the middle of the quadrangular prismatic parts. Between the intermediate steel ring, the inner steel ring and the connecting them second radial ribs are formed multiple identical in shape and size holes spaced at equal distances from each other.

Preferably, the minimum tangential size of the first radial ribs is less than 0.0025 m.

Preferably, the second strips have a maximum radial size of 0.003 m and maximum tangential size 0.006 m.

Preferably, the second radial ribs have a tangential size of less than 0.005 m.

With a pole number 2 p less than 16 and a rotor diameter of more than 0.15 m, the axial slots are divided into two equal parts by a third radial rib with maximum width 0.0025 m, which is located below the middle of the cut-out part and is connecting the intermediate ring to the outer ring, as in each divided axial slot a corresponding permanent magnet is placed in the slot.

Advantage of the brushless electric machine with excitation by permanent magnets, according to the invention is that there is an increased power of the electric machine, which is determined by reducing of the third harmonic component in the field of the magnetic induction above the poles, and that by delta connecting, and the third harmonic component of the current in the phases is reduced due to the eccentricity of the surface of the poles with respect to the inner diameter of the stator, which leads to reduced losses in the stator iron and electrical losses from the third harmonic of the current in the phases when they are delta connected, and hence to increased power. Another reason for providing increased power to the electrical machine, according to the invention, is the reduction of the cross magnetic field generated by the stator winding due to the presence of groups of slots in the segments, as a result of which the inductive reactance of the stator winding, the value of current and electrical losses are reduced.

Another advantage of the electric machine according to the invention is the increased resistance to demagnetization of the permanent magnets from the stator winding field due to the increased magnetic resistance in the intermediate ring, due to the narrowing realized under the medium of the permanent magnets.

Next advantage is the reduced weight and moment of inertia of the rotor due the presence of constrictions in the intermediate ring and the separation of the inner from the intermediate ring by means of the second ribs. The zone of action of the permanent magnets is closer to the zone of maximum energy due to the increased width of the permanent magnets.

BRIEF DESCRIPTION OF THE DRAWINGS

The brushless electric machine with excitation by permanent magnets, according to the invention is illustrated by means of several embodiments shown in the attached figures, where.

DETAILED DESCRIPTION OF THE PREFERRED EMBODIMENTS

Figure 1:
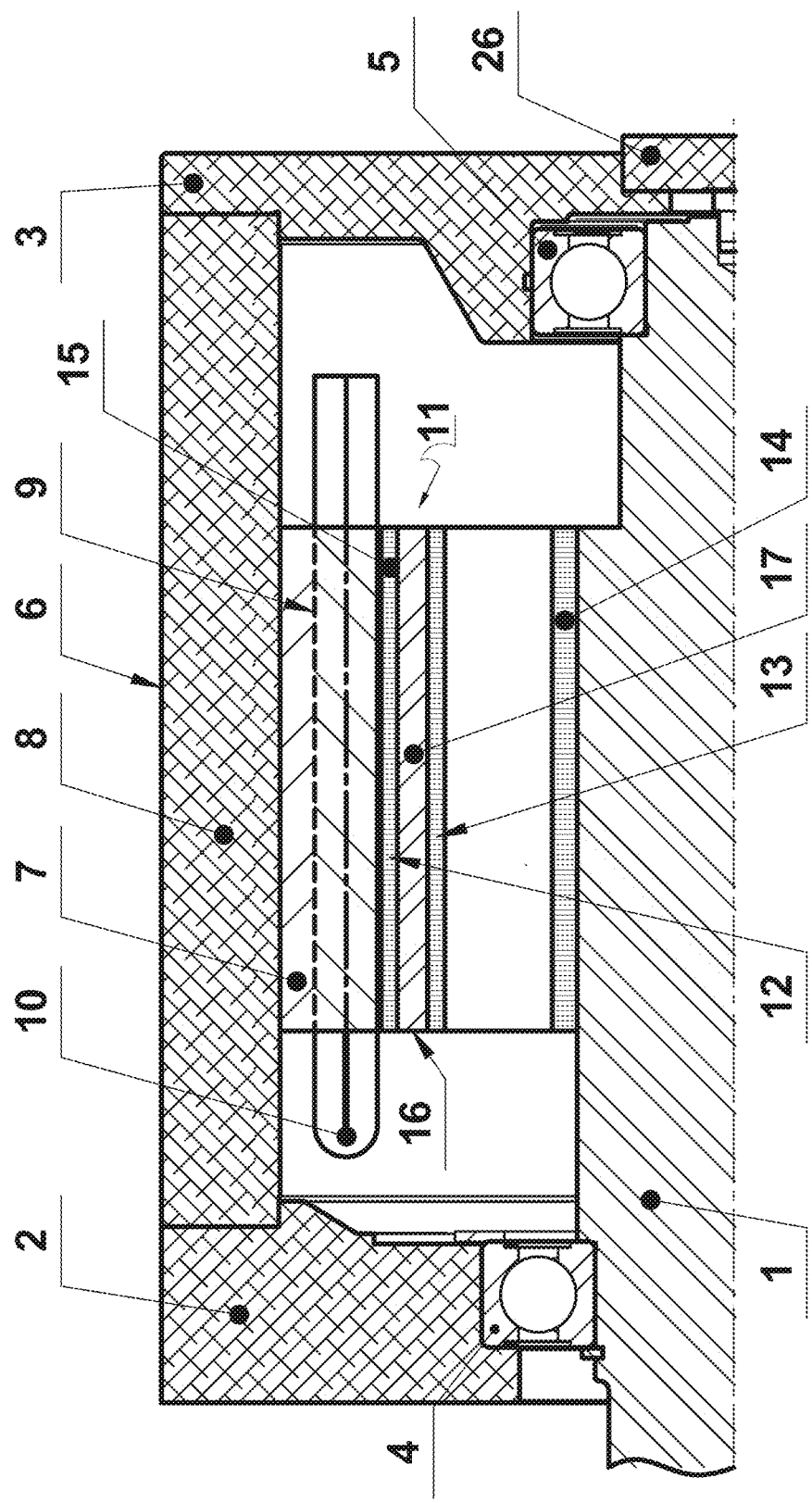
FIG. 1 is a longitudinal half-section through the middle of a permanent magnet of first an exemplary embodiment of the invention realized with whole magnets of brushless electric machine.
Figure 2:
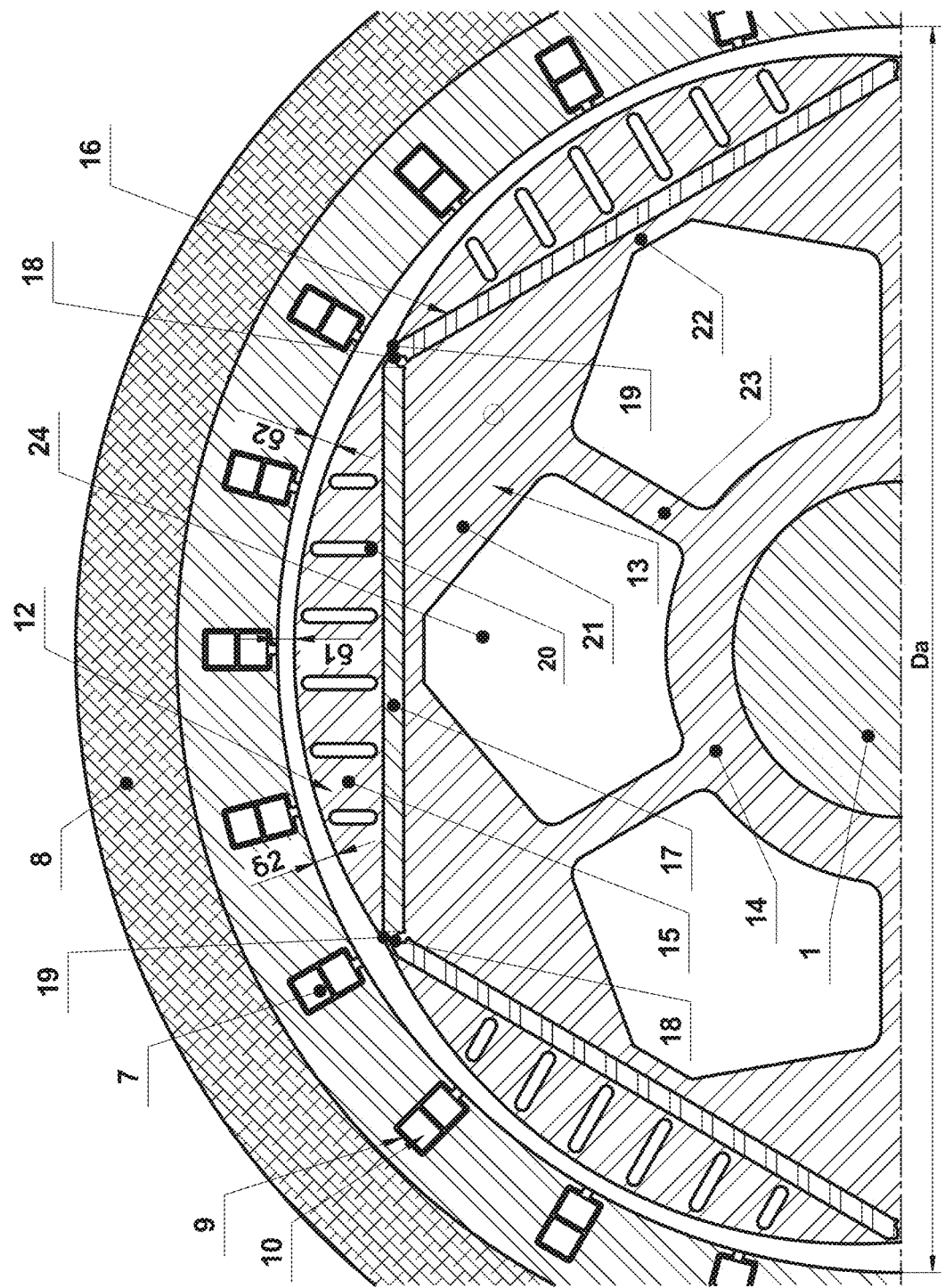
FIG. 2 is a cross-sectional half section of rotor and stator of a brushless electric machine of the invention first embodiment.

FIGS. 1 and 2 show a first embodiment of the invention including shaft 1 sustained in front 2 and rear 3 end bells by front 4 and rear 5 bearings. The front end bell 2 and the rear end bell 3 comprise a stator 6 with an inner diameter Da. The stator 6 comprises a stator pack 7 fixedly enclosed by a housing 8. On the inner surface of the stator pack 7 are formed many evenly distributed slots 9. An insulated coil 10 is placed in each slot 9. The stator pack 7 encloses movably an annular rotor 11. The annular rotor 11 comprises an outer steel ring 12, an intermediate steel ring 13 and an inner steel ring 14. The outer steel ring 12 contains sequentially interconnected cut-out parts 15. Each cut-out part 15 is shaped as part of a steel cylinder cut in a plane containing a chord of the cross-section of the cylinder and the axis of the cylindrical surface of each pole does not coincide with the axis of the shaft 1. In the annular rotor 11, under the flat wall of each cut-out part 15 is formed an axial slot 16 located along the chord into which it is inserted a permanent magnet 17 in the shape of a parallelepiped. The outer surface of the cut-out parts 15 is a pole of the rotor 11 and has three characteristic points. One of the characteristic points is located in the middle of the pole and is at a distance δ1 from the inner surface of stator pack 7. The other two characteristic points are symmetrical to the middle of the pole and are located at distances equal to one third of the pole division and are at a distance δ2 from the inner surface of the stator pack 7, where it is performed the condition b1<b2<2.6δ1.

At each pole of the rotor 11, under the flat wall of the cut-out parts 15, the axial slots 16 located along the chord are surrounded laterally by the first radial ribs 18. Every two adjacent cut-out parts 15 are connected by first strips 19. In each cut-out part 15, above the permanent magnets 17, and to the outer surface of the rotor 11 are formed groups of holes of different lengths, affecting the magnetic flux between rotor 11 and stator 6. The groups of holes are made as at least two elongated axial slots 20 with a maximum width of 0.0025 m and an orientation that is close to the radial. The ends of the sections of each axial elongated slot 20 are formed as semicircles spaced from the outer surface of the rotor 11 and of permanent magnets 17 at distances less than 0.0025 m. The intermediate steel ring 13 includes quadrangular prismatic parts 21 with a maximum radial size 0.6 Da/p. Each quadrangular prismatic part 21 belongs to two adjacent poles of the rotor 11 and has an axis that is parallel to the axis of the stator 6. The quadrangular prismatic parts 21 are connected to each other by second strips 22, which are located below the middle of the poles, and have a maximum radial size 0.003 m and a maximum tangential size of 0.006 m. The intermediate steel ring 13 is connected to the inner steel ring 14 by means of second radial ribs 23 with maximum tangential size 0.005 m, which are located below the midpoints of the quadrangular prismatic parts 21. Between the intermediate steel ring 13, the inner steel ring 14 and the connecting second radial ribs 23 are formed a plurality of identical in shape and size holes 24 spaced apart at equal distances from each other.

Figure 3:
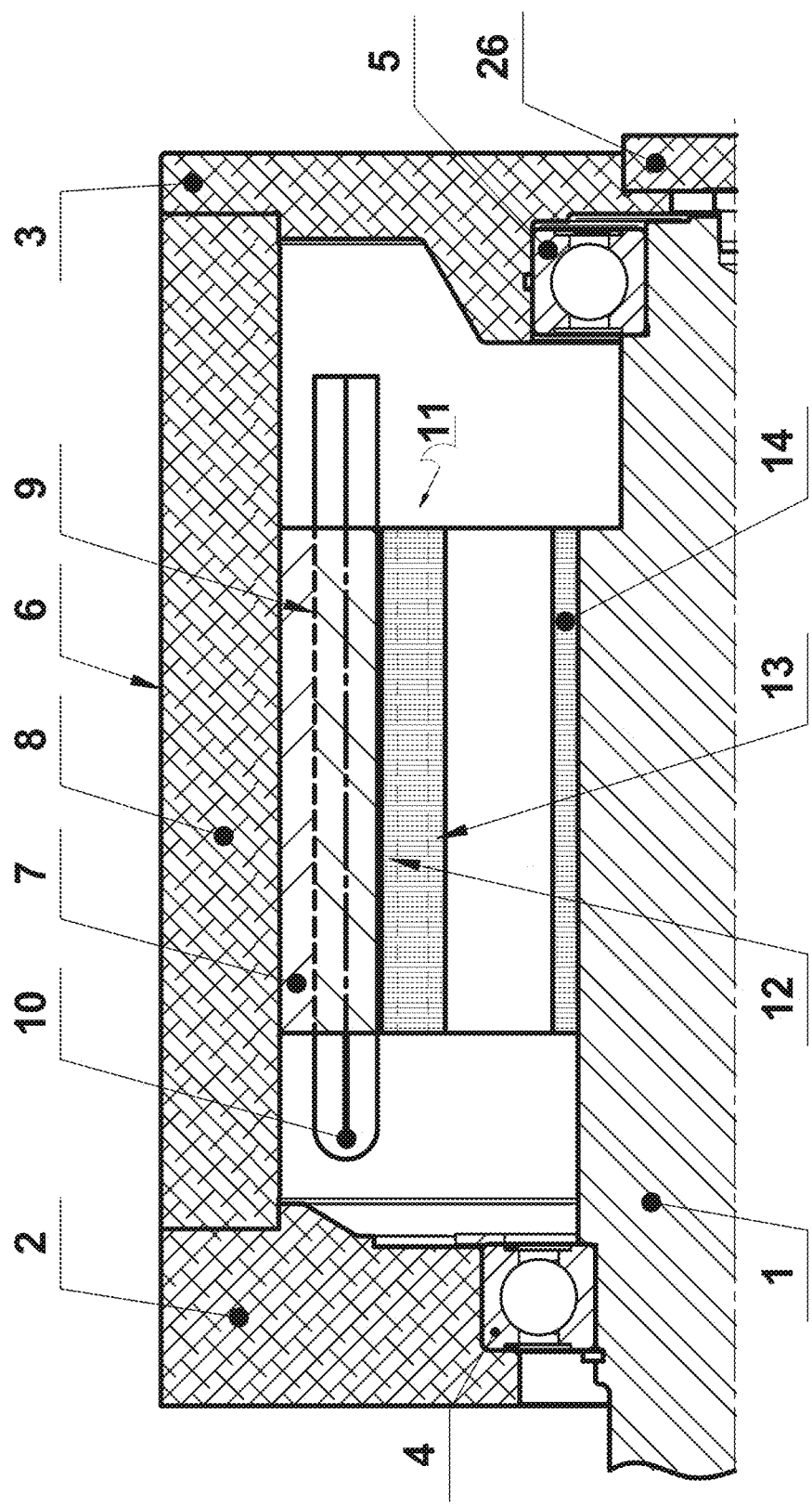
FIG. 3 is a longitudinal half-section through the middle of the pole of brushless electric machine of the invention second embodiment, implemented with divided into two parts permanent magnets by means of ribs.
Figure 4:
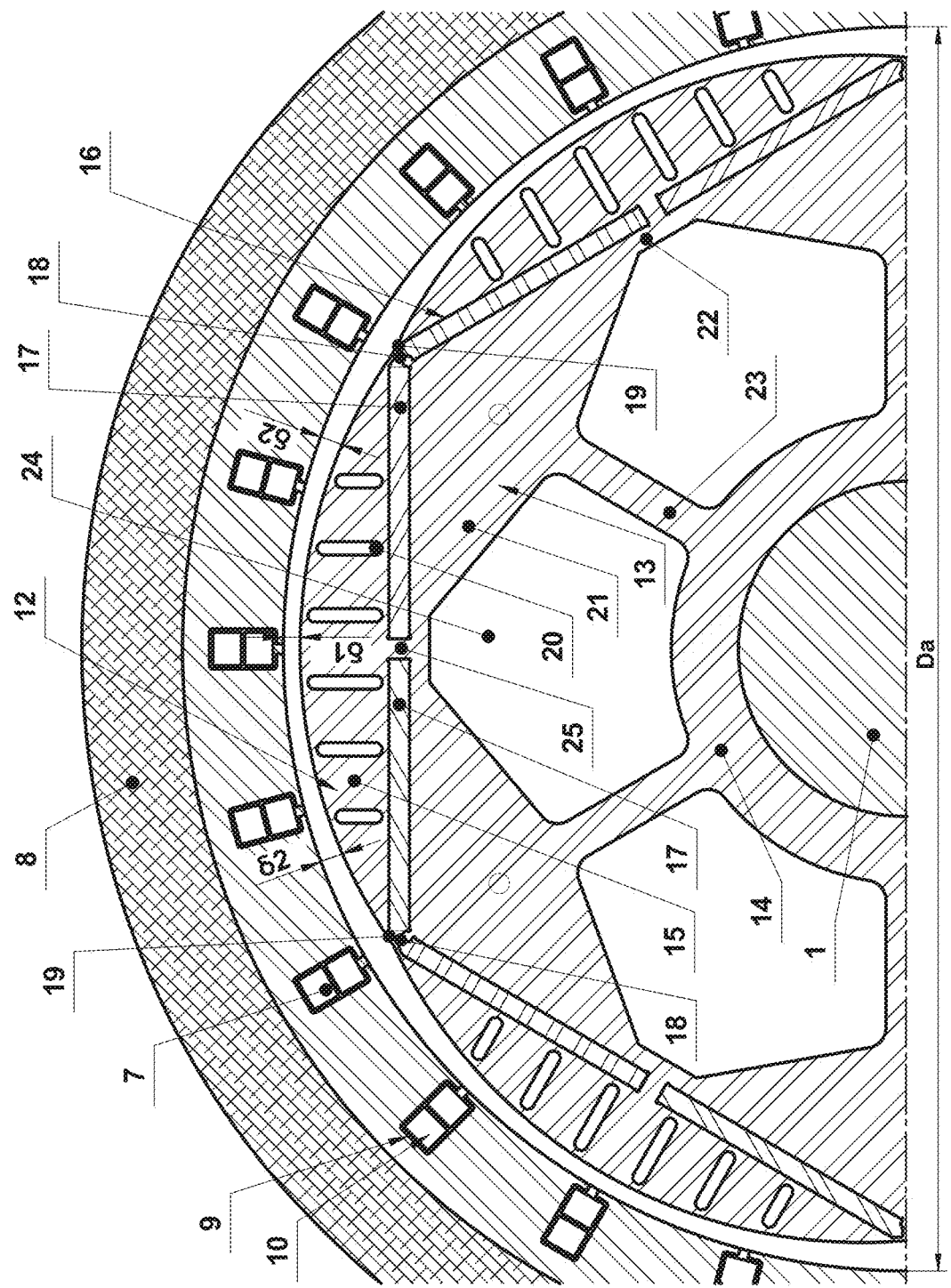
FIG. 4 is a cross-sectional half section of rotor and stator of a brushless electric machine realized by a second embodiment of the invention, wherein the permanent magnets are divided into two parts by means of ribs.
Figure 5:
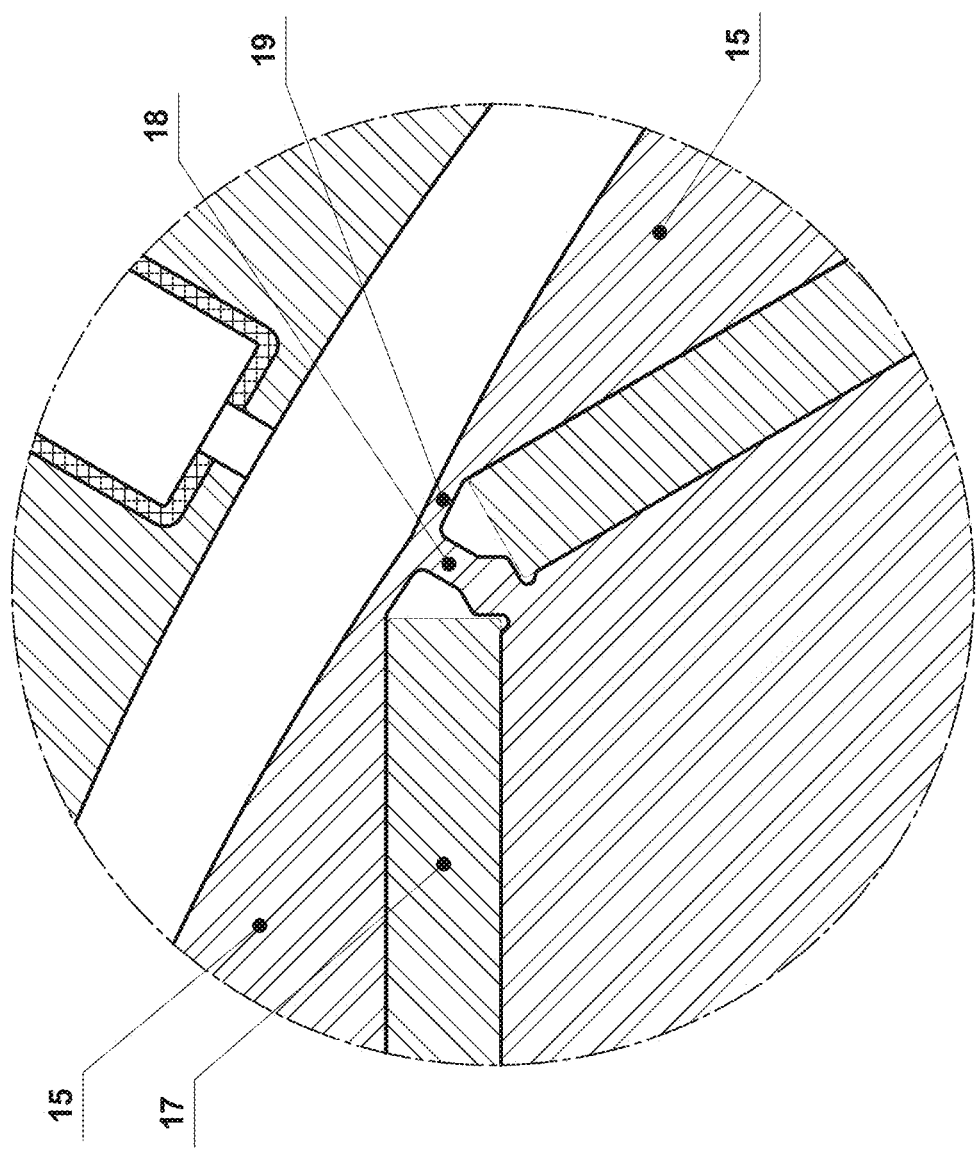
FIG. 5 is an enlarged partial section showing the connection of two adjacent cut-out parts in the area between two adjacent permanent magnets.

FIG. 3, FIG. 4 and FIG. 5 show a second embodiment of the invention, which is applicable for a number of poles 2 p less than 16 and for a diameter of rotor 11 greater than 0.15 m. This embodiment differs from the first embodiment in that the axial slots 16 located along the chord are divided into two equal parts by a third radial rib 25 with a maximum width of 0.0025 m, which is located below the middle of the cut-out part 15 and connects the intermediate ring 13 with the outer ring 12. In each divided axial slot 16 is inserted a corresponding permanent magnet 17.

It is possible for the embodiments described above to be realized without housing 8.

It is possible for the brushless electric machine according to the invention to be connected control sensor 26.

Working of the Invention

The permanent magnets 17 create a permanent magnetic flux, which closes between adjacent poles and passes through the air gap between the rotor 11 and the stator 6. When applying a controllable three-phase voltage to the stator winding 10, from the interaction of the current flowing in the winding 10 with the magnetic flux is generated torque, which when rotating the annular rotor 11 forms a corresponding power.

Through the eccentric air gap, the permanent magnets 17 in the rotor 11 of the brushless electric machine creates a magnetic field in the air gap above each pole with the highest value of magnetic induction in the middle of the pole and with decreasing values of the magnetic induction to the pole ends. So, at one layer of permanent magnets 17 in the air gap the third harmonic component of the magnetic field is reduced. Through the elongated axial slots 20 in the cut-out parts 15 in the outer steel ring 12 of the rotor 11, during operation of the electric machine the inductive reactance is reduced, and the value of the current is reduced without causing a reduction in power. As a result of this, during the operation of the electric machine the iron and main losses are reduced, and when its phases are delta connected, the additional electrical losses are also reduced. As a result of this, the power is increased.

Experimental Data in the Examination of Experimental Model Implementing the Invention A physical sample was experimentally examined, which was made without being introduced the improvements according to the invention, and it is compared with a physical sample which is made according to the invention. The design parameters of the two samples are: stator outer diameter 0.18 m; inner diameter of the stator 0.14 m; length of the stator pack 0.05 m; 2p=12; number of slots Z=72; delta connecting of the windings. Rated parameters: power 5 kW; rotation speed 5000 $min^{-1}$; battery voltage 48 V. By measuring the useful power, which is carried out by measuring the speed and torque, it is established increase in the efficiency of the sample made according to of the invention, in relation to the model not constructed according to the invention, from 89.8% to 93.7%, i.e., the power is increased by more than 0.2 kW and the weight of the steel is reduced by about 30%, at a moment of inertia reduced by 20%.

REFERENCES

1. U.S. Pat. No. 8,575,807 B2

What is claimed is:
1. A brushless electrical machine with permanent magnet excitation, the brushless electrical machine comprising:
   a front end bell;
   a rear end bell, the front end bell and the rear end bell including a stator containing a stator pack, the stator pack having an inner surface and a plurality of evenly distributed slots on the inner surface, a three-phase winding laid in the plurality of evenly distributed slots;
   a housing covering the stator pack;
   a front bearing;
   a rear bearing;
   a shaft sustained in the front end bell and the rear end bell by the front bearing and the rear bearing;
   a movable annular rotor fixed to the shaft, enclosed by the stator pack, and having an outer surface and axial slots located near the outer surface, the movable annular rotor including:
      an inner steel ring;
      an intermediate steel ring;
      an outer steel ring covering the intermediate steel ring;
      at least four poles of permanent magnets inserted into the axial slots;
   groups of holes formed in the areas between the permanent magnets and the outer surface of the movable annular rotor, the groups of holes having different length affecting the magnetic flux between the movable annular rotor and the stator, each group of holes including at least two elongated slots with a maximum width of 0.0025 m and with a slot orientation close to a radial, an end of a cross section of each elongated slot being shaped like a semicircle and being spaced from the outer surface of the movable annular rotor and from the permanent magnets at distances less than 0.0025 m;
   sequentially interconnected cut-out parts contained by the outer steel ring, each of the sequentially interconnected cut-out parts being shaped as part of a steel cylinder cut in a plane containing a chord from a cylinder cross section, an axis of a cylindrical surface of each pole not coinciding with an axis of the shaft,
   each sequentially interconnected cut-out part having a flat wall, one of the axial slots being formed under each flat wall, an outer surface of each cut-out part being a pole of the movable annular rotor and having three characteristic points, a first point of the three characteristic points being in the middle of the pole of the movable annular rotor, spaced apart at a distance ($\delta1$) from an inner surface of the stator, the other two points of the three characteristic points being located symmetrically to the first point at distances of one third of the pole division and being spaced from the inner surface of the stator at a distance ($\delta2$), where $\delta1<\delta2<2.6\delta1$;
   the intermediate steel ring including quadrangular prismatic parts with a maximum radial dimension of 0.6 Da/p wherein Da is the inner diameter of the stator and 2 p is the number of poles, each of the quadrangular prismatic parts belonging to two adjacent poles of the movable annular rotor;
   second strips connecting the quadrangular prismatic parts, each of the second strips being located under the middle of the poles;
   first radial ribs at boundaries between the poles, the first radial ribs connecting the outer steel ring to the intermediate steel ring;
   the cut-out parts in the area between the permanent magnets and the first radial ribs being formed as first strips with maximum radial size 0.0006 m;
   second radial ribs connecting the intermediate steel ring to the inner steel ring, the second radial ribs being located under the middle of the quadrangular prismatic parts; and
   a plurality of holes identical in shape and size, adjacent holes of the plurality of holes equally spaced from each other, each of the plurality of holes being between the intermediate steel ring, the inner steel ring, and the connecting second radial ribs.

2. The brushless electrical machine with permanent magnet excitation according to claim 1, wherein the minimum tangential size of the first radial ribs is less than 0.0025 m.

3. The brushless electrical machine with permanent magnet excitation according to claim 1, wherein the second strips have a maximum radial size of 0.003 m and maximum tangential size 0.006 m.

4. The brushless electrical machine with permanent magnet excitation according to claim 1, wherein the second radial ribs have a tangential size less than 0.005 m.

5. The brushless electrical machine with permanent magnet excitation according to claim 1, wherein at a pole number 2 p less than 16 and diameter of the movable annular rotor of more than 0.15 m, the axial slots are divided into two equal parts by a third radial rib with maximum width 0.0025 m, the third radial rib being located below the middle of the cut-out part and connecting the intermediate ring to the outer ring, a permanent magnet being placed in each equal part of the divided axial slots.

* * * * *